No. 721,830. PATENTED MAR. 3, 1903.
C. P. PERIN.
METHOD OF FREEZING THE GROUND AND EXCAVATING OR TUNNELING.
APPLICATION FILED FEB. 18, 1902.
NO MODEL. 2 SHEETS—SHEET 2.
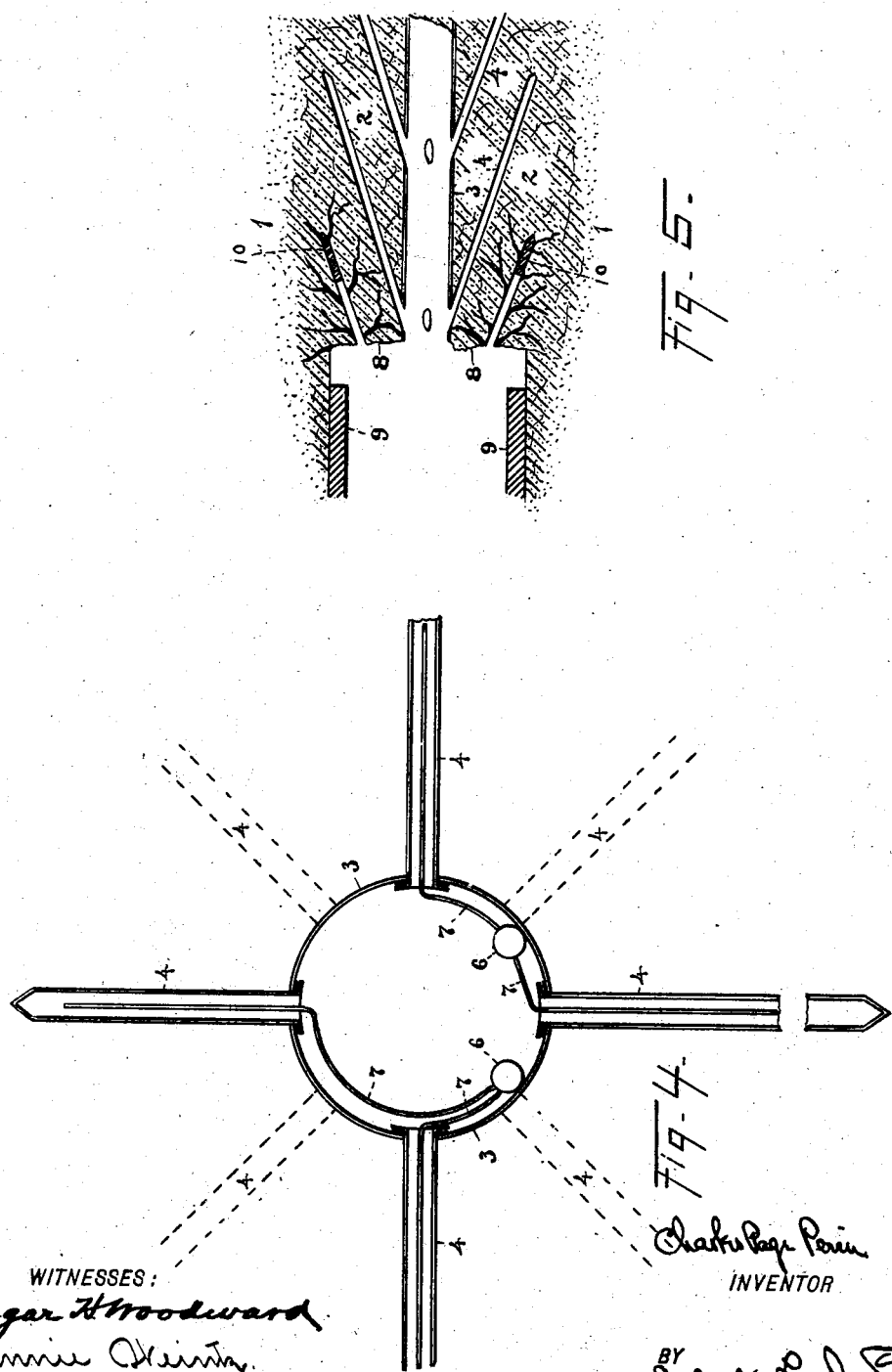

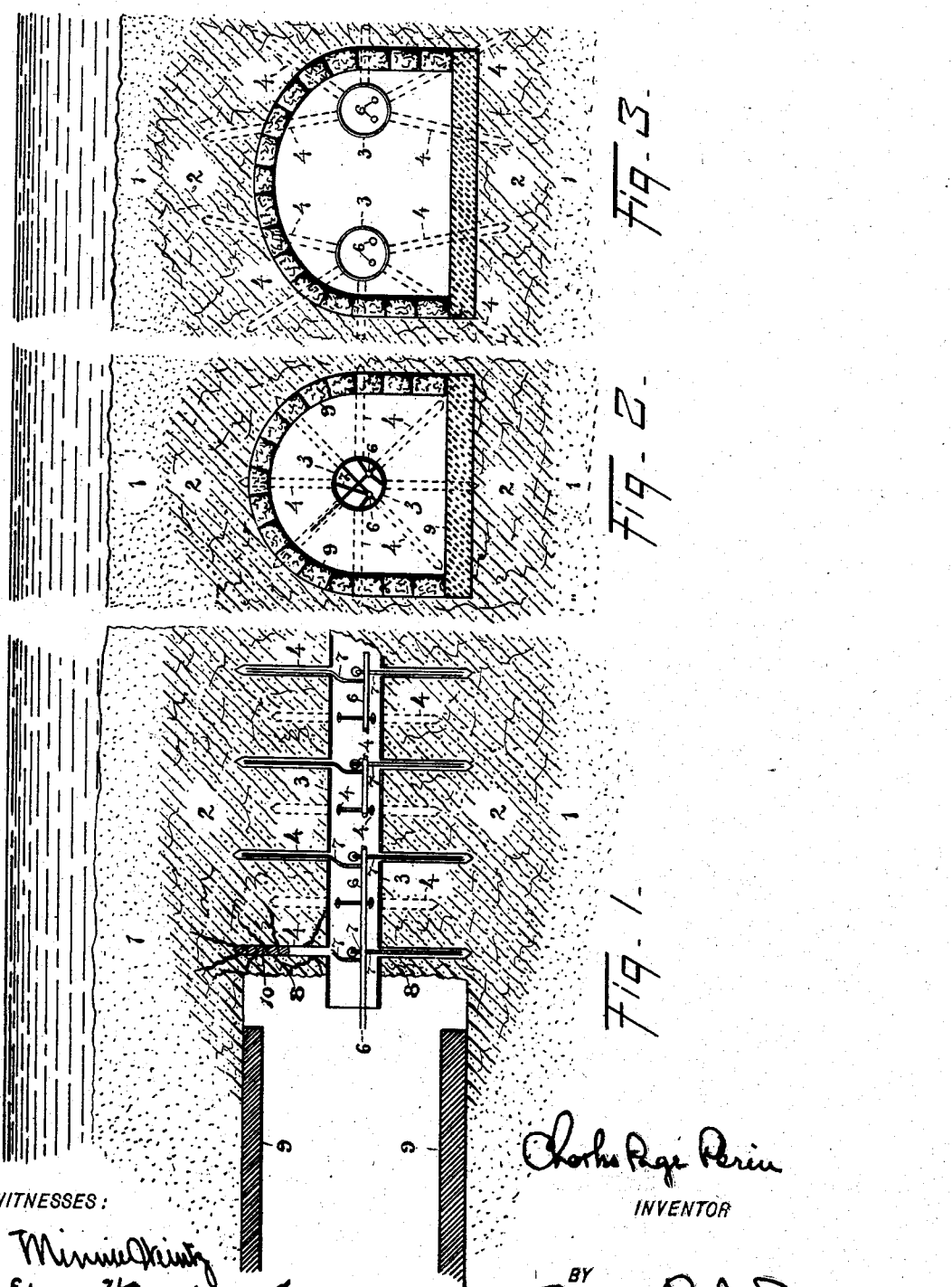

UNITED STATES PATENT OFFICE.

CHARLES P. PERIN, OF NEW YORK, N. Y.

METHOD OF FREEZING THE GROUND AND EXCAVATING OR TUNNELING.

SPECIFICATION forming part of Letters Patent No. 721,830, dated March 3, 1903.

Application filed February 18, 1902. Serial No. 94,653. (No model.)

*To all whom it may concern:*

Be it known that I, CHARLES PAGE PERIN, a citizen of the United States, and a resident of New York, in the county of New York and State of New York, have invented certain new and useful Improvements in Methods of Freezing the Ground and Excavating or Tunneling, of which the following is a specification.

My invention relates to the process of freezing the ground and making excavations, and particularly to excavations for tunnels or other subterranean or submarine structures, and especially where the work is being carried on in soft or yielding or water-bearing material, and has more particular reference to those instances where the freezing method may be advantageously or necessarily employed.

The objects of my invention are to provide a practical method of freezing the ground and a form of excavation which may be safely, economically, easily, and quickly constructed. These objects I attain by the use of the process and devices illustrated in the accompanying drawings and described in the following specification and claimed specifically hereinafter.

In the drawings like figures of reference refer to like parts throughout the respective views.

Figure 1 is a longitudinal sectional view of the heading of an excavation or tunnel—for example, under a river—showing the method and devices I employ for freezing the material, disintegrating, and finding the temperature of the same. Fig. 2 is a cross-section of the tunnel, showing said methods and means for performing the freezing and other processes. Fig. 3 shows my invention applied to a plurality of pilot-tunnels. Fig. 4 is a cross-section of these devices, showing the parts and details enlarged for better reference. Fig. 5 is a longitudinal sectional elevation showing some of the radiating tubes set diagonally to the axis of the pilot-tunnel.

My invention is intended to provide new and improved methods and to increase the efficiency of existing methods of freezing water-bearing or soft material through which excavations or tunnels or similar structures are to be made and constructed, and to provide improved methods of disintegrating or breaking up the frozen material preparatory to removal, and to provide opportunity for obtaining evidence of temperature at any given point, and on reference to the figures and subsequent description the application of these methods will be clear.

In Fig. 1, 1 is the material in which and through which the tunnel is to be excavated or constructed. 2 is the frozen material through which the heading is advanced and the main tunnel constructed. 3 is the pilot-tunnel; 4, the auxiliary or radiating tube, set approximately at right angles to the axis of the pilot-tunnel and sometimes staggered, as illustrated.

In Fig. 5, 4 shows some of these tubes radiating from the pilot-tunnel, but their axes inclined diagonally or at an angle to the axis of the pilot-tunnel. 6 6 are the main feeding-pipes. 7 represents the small circulating-pipes, communicating with the main feeding-pipes 6 and extending into the auxiliary radiating tubes 4. 8 is the frozen material at the immediate heading of the tunnel; 9, the material of the tunnel itself; 10, the means for splitting the frozen material.

In order to increase the speed of and diminish the time required for freezing the material for excavation in works of this class, I adopt sometimes, in combination with the pilot-tunnel constructed in advance of the main excavation or tunnel, a series of radiating tubes or holes made by boring or otherwise, in which the freezing process may be carried out either in themselves alone or in coöperation or conjunction with the freezing accomplished by means in the pilot-tunnel itself.

The different steps constituting the process which forms my invention are as follows: I preferably first construct a pilot-tunnel as described and set out in an application for patent by Charles Sooysmith, filed December 23, 1901, Serial No. 86,946 of series of 1900. Through holes in the casing of this pilot-tunnel I make holes or cells 4 or force tubes of the proper size, preferably about eight inches in diameter and of such a final length as may be necessary to produce the required radius of frozen material from the axis of the pilot-tunnel. These holes or tubes may be placed either at right angles to the axis of the pilot-tunnel or they may be placed with their axes diagonal to the axis of the pilot-tunnel. They may be set in straight rows or staggered. If tubes are used, they may be of wood, metal, or any suitable material, size, or shape, and they may be in sections, so that they can be extended to a much greater distance than the diameter of the pilot-tunnel would permit were they made in one piece, since the first section can be inserted and subsequent sections attached thereto and this extension process be carried on indefinitely. These tubes may be entirely closed at one end or left open. They may be split or solid, and they may be adapted to be withdrawn entirely after the freezing effect has been produced. The freezing process may then be carried out in these cells or tubes either by permitting the freezing agent in the pilot-tunnel to operate directly in them or by means of small pipes inserted in them and connecting with the main supply of the freezing agent, by which this freezing agent can circulate within these small pipes, or in any other way that may seem advantageous or desirable. During this freezing process by inserting a thermometer I am enabled to determine the temperature at the extreme end or any part of the cell or tube, and thus obtain definite information as to the probable solidity of the surrounding material. If it is desired to remove the tubes at any time or to extend them farther, a jet of steam or hot water or other thawing agent may be circulated in the small pipes or the tube itself for the purpose of sufficiently softening the immediately-surrounding material, and thus making the adjustment of the tube or its extension or removal easy. When the material 2 is sufficiently frozen and the excavation of the heading of the main tunnel has progressed so far as to approach more or less closely to the tube 4 or the hole within the frozen material, I may insert in the tube or hole 4 means for rending or disintegrating the material 8 at the heading—as, for instance, an explosive charge, a wedge or other expanding device, or preferably a quicklime cartridge 10, which in the latter case can be made to expand and break off or disintegrate this material on the application of moisture in the shape of hot water, steam, or otherwise—thus facilitating the quick, safe, and easy removal of the frozen material at the heading and surrounding these tubes or holes as they are successively approached.

It is evident that this process can be indefinitely continued, keeping always ahead of the main excavation or construction. It is also evident that this process is equally adaptable in the case of the diagonally-inclined holes or tubes.

I also wish it to be understood that my invention is applicable to shafts, wells, or other vertical or inclined excavation or to any other use or operation in which the process of freezing the surrounding material is resorted to. It is also adaptable where a plurality of pilot-tunnels are constructed and even where these holes or tubes are thrown out radially from the main tunnel or excavation and no pilot-tunnel is constructed, and I do not limit myself to the use of tubes or tubes or holes in combination with the pilot-tunnel.

I wish it to be understood that by the use of the words "pilot-tunnel" herein I mean a tunnel or working chamber of sufficient size to permit workmen to excavate and insert tubes from within and constructed in advance of or prior to the construction of the main tunnel or excavation as distinguished from a pilot-tube of too small proportions to permit of such excavation or other operation.

I do not claim, broadly, the use of tubes in which I can circulate freezing agents, but What I do claim, and desire to protect by Letters Patent, is—

1. The method of excavating which consists in, first, constructing a pilot-tunnel in advance of the main excavation; second, extending radially therefrom a plurality of cells; third, circulating therein freezing agents; fourth, inserting therein means for disintegrating the surrounding material; fifth, disintegrating the surrounding material by said means; sixth, removing the disintegrated material, substantially as described.

2. The method of excavating which consists in, first, constructing a pilot-tunnel in advance of the main excavation; second, extending radially therefrom a plurality of cells; third, circulating therein freezing agents; fourth, disintegrating the surrounding material by means contained in the cells, substantially as described.

3. The method of excavating which consists in, first, constructing a pilot-tunnel in advance of the main excavation; second, extending radially from the pilot-tunnel a plurality of cells; third, circulating therein freezing agents; fourth, removing the frozen material, substantially as described.

4. The method of excavating which consists in, first, extending radially from the axis of the proposed excavation a plurality of cells; second, circulating therein freezing agents; third, inserting therein means for disintegrating the surrounding material; fourth, disintegrating the surrounding material by said means; fifth, removing the disintegrated material, substantially as described.

5. The method of excavating which consists in, first, extending radially from the axis of the proposed excavation a plurality of tubes; second, circulating therein freezing agents; third, removing the tubes; fourth, inserting in the cavity left by the tubes means for disintegrating the surrounding material; fifth, disintegrating the material by said means; sixth, removing the disintegrated material, substantially as described.

6. The method of excavating which consists in, first, extending radially from the axis of the proposed excavation a plurality of tubes; second, circulating within the same freezing agents; third, removing the tubes; fourth, inserting quicklime in cavity formed thereby; fifth, supplying moisture to the quicklime so as to expand the same and disintegrate the surrounding material; sixth, removing the disintegrated material substantially as described.

7. The method of freezing the ground which consists in, first, constructing a pilot-tunnel in advance of the main excavation; second, extending radially therefrom and in planes perpendicular to the axis of the same, a plurality of cells; third, circulating therein freezing agents, substantially as described.

8. The method of excavating which consists in, first, constructing a pilot-tunnel in advance of the main excavation; second, extending radially therefrom and in planes perpendicular to the axis of the same, a plurality of cells; third, circulating therein freezing agents; fourth, removing the frozen material, substantially as described.

9. The method of freezing which consists in circulating a medium of cold in cells set radially from an approximately common center, substantially as described.

10. The method of freezing which consists in circulating a medium of cold in tubes set radially from, and in planes approximately perpendicular to, an approximately common axis, substantially as described.

11. The method of excavating which consists in, first, extending radially from the axis of the proposed excavation a plurality of cells; second, circulating therein a medium of cold; third, removing the frozen material, substantially as described.

12. The method of excavating which consists in, first, extending radially from the axis of the proposed excavation a plurality of tubes; second, circulating within the same freezing agents; third, inserting in the tubes means for disintegrating the surrounding material; fourth, disintegrating the material by said means; fifth, removing the disintegrated material, substantially as described.

13. The method of excavating which consists in, first, extending radially from the axis of the proposed excavation, a plurality of tubes; second, circulating within the same freezing agents; third, inserting quicklime in one or more of the tubes; fourth, supplying moisture to the quicklime so as to expand or fracture the tube and disrupt the surrounding material; fifth, removing the disintegrated material, substantially as described.

Signed at New York, in the county of New York and State of New York, this 7th day of February, A. D. 1902.

C. P. PERIN.

Witnesses:
WM. E. MCREYNOLDS,
A. KENT.